United States Patent Office 3,327,712
Patented June 27, 1967

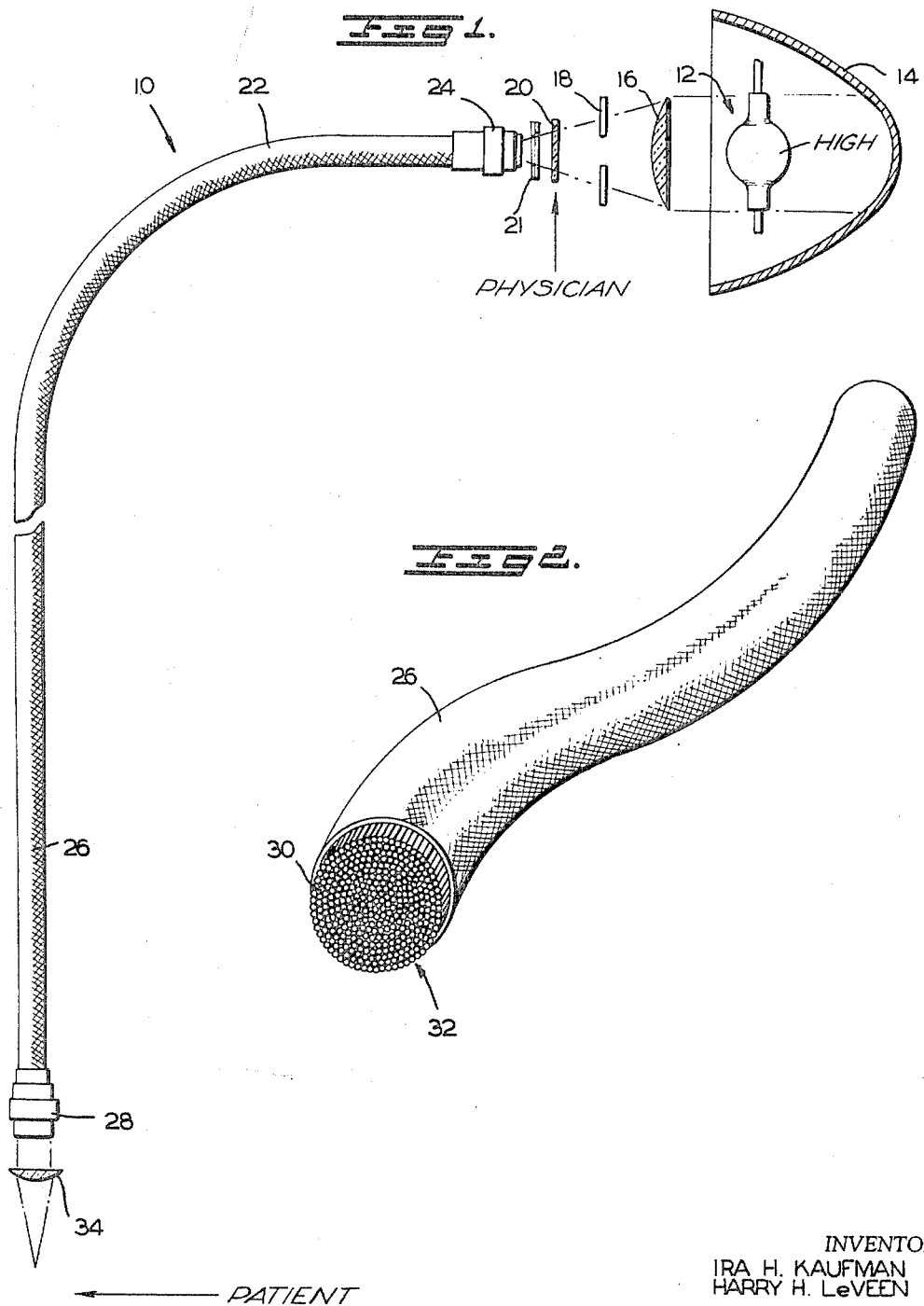

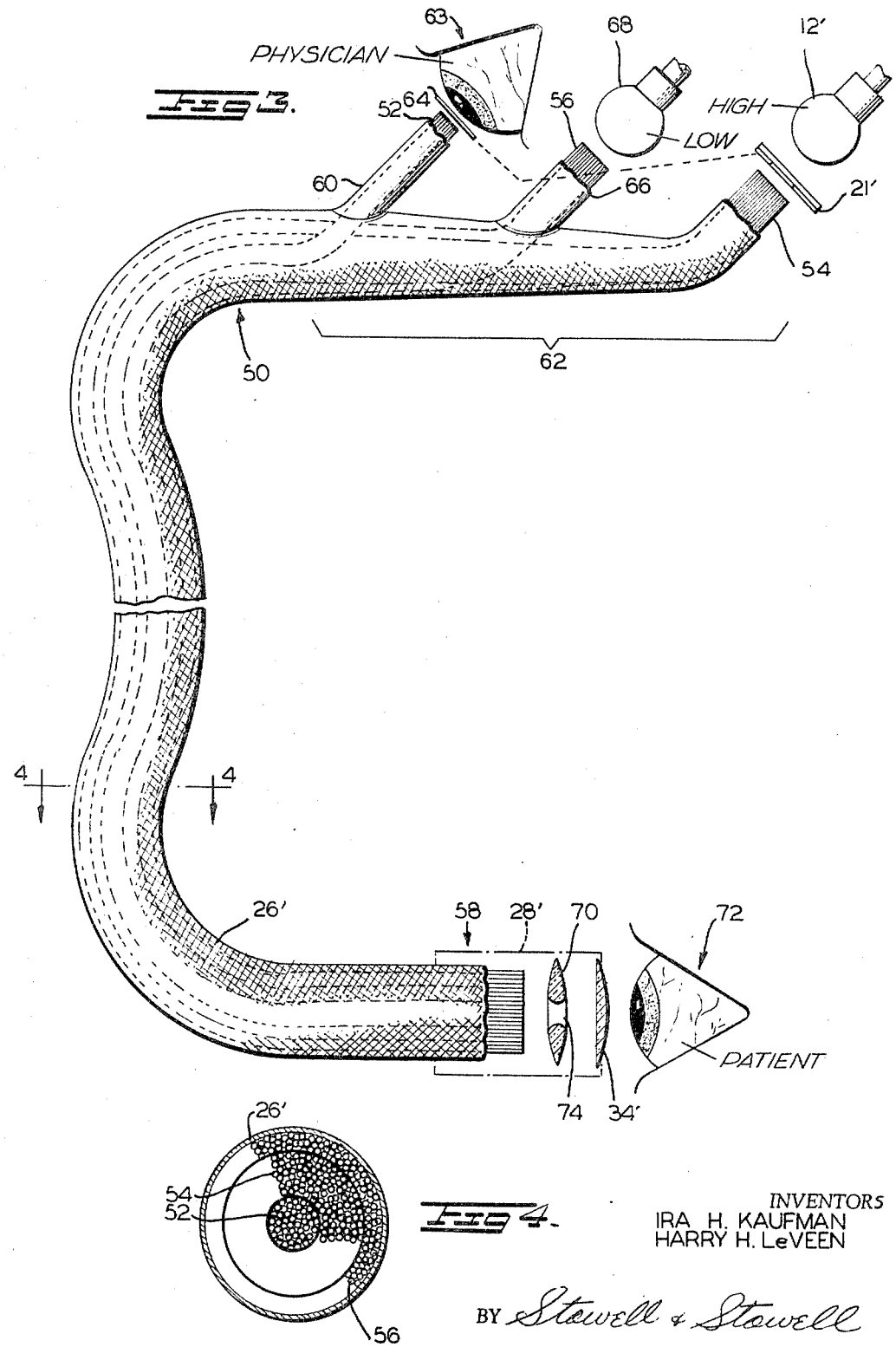

3,327,712
PHOTOCOAGULATION TYPE FIBER OPTICAL
SURGICAL DEVICE
Ira H. Kaufman, 75 S. Middle Neck Road, Great Neck,
N.Y. 11021, and Harry Henry Le Veen, Brooklyn,
N.Y. (85—35 Midland Parkway, Jamaica, N.Y. 11432)
Filed Sept. 15, 1961, Ser. No. 138,353
1 Claim. (Cl. 128—398)

This invention relates to surgical devices and, in particular, to improvements in photocoagulation devices for use in surgery.

It is a particular object of the present invention to provide an improved surgical device whereby a surgeon may direct a photocoagulating light beam directly to a surgical locus with a minimum of interference with the performance of surgery, by transmitting the light from a source thereof to the surgical locus through the medium of a flexible bundle of light-transmitting fibers, thereby eliminating the difficulties normally encountered in attempting to project a beam of light from a remote source through air to the surgical locus.

It is a further object of the present invention to provide means for directing to a bleeding site or an area to be coagulated light in the frequency range of from about 3000 to about 6000 A., corresponding to the peak absorption wave length of hemoglobin and oxyhemoglobin. The quantity A., as used throughout the specification and claim, is an abbreviation for the Angstrom, or Angstrom unit, which is the unit of length customarily used in expressing wavelengths of light.

These and other objects and advantages of the present invention are provided by a surgical device comprising means for supplying to a surgical locus a high intensity beam of light having wave lengths in the range of from about 3000 to about 60000 A., said means comprising a source of light including wave lengths in said range, a flexible bundle of glass fibers transparent to light in said range, and optical elements directing light from said source to one end of said bundle; and to such a device including means for transmitting an image of the surgical locus to an observation point remote from the surgical locus; and also to such a device including means for directing a low intensity beam of illuminating light through a flexible bundle of glass fibers to the surgical locus.

Other objects and advantages of the present invention will become more apparent to those skilled in the art from the following detailed description when considered in light of the accompanying drawings wherein:

FIG. 1 is a schematic view of an improved surgical device incorporating the principles of the present invention having particular utility in coagulating blood at the orifice of a transsected vessel with a minimum of destruction of surrounding tissues;

FIG. 2 is an enlarged perspective view of a flexible bundle of light-transmitting glass fibers with a portion of the protective sheath removed to show the plural fibers of the bundle;

FIG. 3 is a schematic view of an improved surgical device having particular utility in the therapy of abnormalities of the fundus of the eye; and FIG. 4 is a section substantially on line 4—4 of FIG. 3.

In the performance of surgery, transsected vessels cause bleeding and it is desirable to stop bleeding with a minimum of damage to the surrounding tissue and without introducing foreign material into the surgical locus. Transsected vessels are usually grasped with a hemostat clamp and then tied with suture material to prevent blood loss. In case of small vessels, bleeding can also be controlled with electrocoagulation. However, coagulation by high frequency electric currents has been found to generate considerable heat in the zone of bleeding and tissue destruction in the area may be extensive. Because of tissue destruction, electrical current coagulation of small blood vessels is not commonly used and surgeons frequently employ the more time-consuming method of clamping and tying individual bleeders.

Referring to FIGS. 1 and 2 of the application, there is shown a device for photocoagulation of bleeding sites thereby substantially reducing the time necessary for control of blood loss, reducing tissue necrosis surrounding transsected vessels and, in addition, maintaining at a minimum foreign material which may be introduced into the wound.

In FIGS. 1 and 2 the photocoagulation device 10 generally includes a source of high intensity light 12 and a suitable light reflector 14.

The source of high intensity light 12 may comprise a conventional high output incandescent lamp, a mercury vapor lamp, a strobotron or an optical maser or the like.

A strobotron is a gas-filled tetrode used in the production of a high intensity short duration flash of light at the supply frequency rate.

The principles of suitable optical masers for the generation and amplification of light by the stimulated emission of radiation are disclosed in United States Patent 2,929,-922 to Schawlow et al.

The assembly also includes a suitable condensing lens or lenses 16, a fixed or variable aperture 18 and, as will be more fully discussed hereinafter, a blue-green filter 20 mounted for selective insertion in the beam of light may be incorporated in the assembly.

The system may also include a time controlled shutter 21 which may be of the type employed in photographic cameras to control the duration of photographic exposures.

Visible light has a particular advantage in the present invention as it is absorbed by opaque tissue with the generation of heat. The depth of penetration and the amount of heat evolved will depend upon the percentage of light absorbed, the thermal conductance of the material and the intensity of the light source. Since the thermal conductance of non-fat tissue is high, it is necessary to use a high intensity light source for brief periods rather than a low intensity light source for greater periods.

In addition to control of the intensity of the light it has been found that a minimum of damage to the surrounding tissue is assured when the wave lengths of the high intensity beam of light are in the range of from about 3000 to about 6000 A. Within this range substantially only hemoglobin, oxyhemoglobin and related pigments will absorb appreciable amounts of the light energy. It is known that the peak absorption rate of hemoglobin and oxyhemoglobin is in the range of from 3500 to about 500 A., therefore by using a light source having wave lengths within this range it is not necessary to provide a filter to remove unwanted wave lengths. However, where an ordinary incandescent light source is used a suitably cooled filter 20, transparent only to light having wave lengths in the range of from about 3000 to about 6000 A., is employed to remove the unwanted wave lengths. As to be more fully discussed hereinafter, the filter may be incorporated in the fiber bundle used for directing the light from the optical elements to the locus to be treated.

Mercury arc lamps have been found to give very satisfactory emission as the maximum light energy produced by a mercury arc lamp comprises frequencies in the range of from about 3500 to about 5500 A. corresponding to the peak absorption band of hemoglobin and oxyhemoglobin and it is unnecessary to use a blue-green filter transparent to light in the range of from about 3000 to about 6000 A. to reduce tissue destruction in the area of the transsected vessels.

Further control of the intensity of the light source may be provided by the variable aperture device 18 positioned between the source of light and end 24 of the flexible bundle of light transmitting glass fibers.

The time of exposure of the surgical locus, to the high intensity beam of light, may be controlled by the variable time controlled shutter mechanism 21 and preferably the shutter mechanism is provided with an actuating lever which may be controlled by the surgeon's foot, thereby freeing his hands.

The flexible bundle of light transmitting glass fiber generally designated 22 generally includes a flexible sheath 26 preferably constructed of opaque material. The sheath 26 extends between the light source end 24 and the light outlet end 28 of the device. Within the flexible sheath 26 is maintained a plurality of light transparent glass fiber elements 30 which make up the glass fiber bundle 32. The sheath 26 should be constructed of material which will permit heat and/or gaseous sterilization of the surgical device.

As is known in the art, each of the glass fibers 30 of the bundle 32 may have a diameter of from, for example, fiive microns to, for example, 50 microns which fibers behave like glass rods and transmit light therethrough. Each of the fiber elements 30 has a high quality surface to reduce light loss by surface scattering as a ray of light, in even a large fiber of, for example, 50 microns, may be reflected as many as 3,000 to 4,000 times per foot.

In order to further reduce scattering of the light passing through the fiber bundle each of the fiber elements thereof is provided with a thin jacket of transparent material whose index of refraction is generally lower than the index of refraction of the glass rod forming the light channel. An additional advantage of such a thin jacket is that it protects the fiber wall where total internal reflection takes place maintaining it in its original clean and smooth condition.

Flexible glass fiber bundles may be made coherent or incoherent. A conherent bundle will transmit an image and is one in which the fibers at each end of the bundle have a corresponding arrangement. An incoherent bundle is entirely satisfactory for a light guide which does not need to transmit an image as in the present instance. It is much easier to make such bundles of randomly arranged fibers and in view of the savings in cost and the fact that it is unnecessary to transmit an image in this device, incoherent bundles of fibers are preferable.

In the form of the invention shown in FIGS. 1 and 2, the fiber elements 30 comprising the bundle 32 are of uniform diameter. However, it is contemplaed that the diameter of each of the fiber elements of the bundle 32 may change gradually along its length whereby light entering at end 24 may be concentrated at end 28 or spread out at end 28 depending upon whether a larger area or a smaller area is to be subjected to the photocoagulating effect of the light beam passing through the transparent bundle of glass fibers. It has been found that light coming from an enlarged end of such a bundle is more nearly collimated than light in the original image and conversely that light issuing at a reduced end of such a bundle is less collimated than the light originally received at the opposite end of the bundle.

The diameter of the fiber bundle 32 may be variously modified to suit the particular needs of the surgeon using the device. However, in general bundles having a cross sectional dimension of from about 1/16 to 3/4 inch would provide a useful range.

While, as hereinbefore discussed, magnification or minification may be obtained within the fiber elements of the fiber bundle 32, as illustrated in FIG. 1 of the drawings, a suitable optical element illustrated as lens 34 may be carried by the end piece 28 to either converge or diverge the beam of light issuing from said end. By employing either diverging, converging or straight fibers and a suitable range of lenses 34 the surgeon may be provided with an instrument having an extremely wide range of use.

It will also be appreciated by those skilled in the art that by means of the interchangeable optical elements at end 28 in combination with suitable filers, the shutter 21 and the variable diaphragm 18, substantial control of the coagulating effect of light on hemoglobin and oxyhemoglobin is obtainable. Further while a constant intensity source of light would generally be employed in the device, a suitable voltage regulator may be interposed between the source of energizing electrical current and the light source whereby the intensity of the light passing through the device may be readily controlled. Further, it will be appreciated that where a foot operated shutter is employed in the device, the foot controlled shutter actuator may include a switch for energizing the light source whereby as long as the actuating lever is depressed, the shutter is open and the light source is energized while closing of the shutter and deenergization of the light source is effected upon removal of pressure from the foot actuator.

A further form of the present invention, having particular utility in the therapy of abnormalities of the fundus of the eye, is illustrated in FIGS. 3 and 4 of the drawings. Referring to FIGS. 3 and 4, the improved photocoagulating surgical device is generally designated 50 and includes a flexible sheath 26' preferably constructed of an opaque material, which will prevent entrance of the room light into the fibers of the fiber bundles contained therein. Sheath 26', like sheath 26 of the form of the invention shown in FIGS. 1 and 2, is preferably constructed of a material which will permit sterilization of the surgical device by known sterilization methods.

Within the sheath of the illustrated form of the invention, there are three separate fiber optical bundles generally designated 52, 54 and 56 which are independent of one another and at end 58 of the device 50 comprise an inner core and a pair of concentric fiber optical sleeves, each of which performs a distinct function as to be more fully described hereinafter.

Fiber bundle 52, comprising the center core at end 58, is an oriented bundle of glass rods, each of which is provided with an intimate coating of glass of a lower index of refraction. Fiber bundle 52 is brought out from its central position and terminates in a viewing end 60, at end 62 of the surgical device 50.

The fibers of the bundle 52 are coherent in that the fibers at each end of this bundle have a corresponding arrangement and will, therefore, transmit an image from end 58 to the viewing end 60. Further, each of the fibers of the image transmitting bundle 52 is preferably tapered with the large end of each of the fibers at the viewing end 60 and the small end of each of the fibers at end 58 to provide, for example, three to four times magnification of the viewed image.

The fiber optical bundle 54 which concentrically surrounds the image transmitting fiber bundle 52 at end 58 of the device 50 is withdrawn and bunched at the opposite end 62 and terminates at a source 12' of high intensity light which may comprise a conventional high output incandescent lamp, a mercury vapor lamp, a strobotron or an optical maser or the like as disclosed with reference to high intensity light source 12 of the form of the invention shown in FIGS. 1 and 2.

Interposed between the source of light 12' and the light receiving end of fiber bundle 54 is a normally closed shutter 21' which is mechanically interconnected to a filter 64 positioned adjacent the viewing end of the image transmitting fiber optical bundle 52. The mechanical interconnection between the shutter 21' and the filter 64 is such that when the shutter is closed, the filter 64 is moved out of optical alignment between the end of the image transmitting fiber bundle 52 and the viewer 63 and when the shutter is open, permitting coagulating light to be transmitted through the fiber optical bundle 54, the filter 64 passes between the viewing end of the fiber bundle 52 and the viewer, thereby preventing the high intensity light beam from effecting the eye of the viewer while permitting the viewer to observe the surgical site.

The third fiber optical bundle 56, which at end 58 forms the outermost concentric sleeve of the composite optical device, terminates at end 62 at 66 adjacent an illuminating source of light of relatively low intensity 68.

Since fiber bundles 54 and 56 only function as light guides and do not need to transmit images, fiber bundles 54 and 56 may comprise incoherent or randomly arranged fibers substantially reducing the cost of manufacturing the device.

As more fully discussed with reference to FIGS. 1 and 2, at end 62 of the surgical device 50, the fiber bundles 52, 54 and 56 may also be provided with suitable condensing lenses, fixed or variable apertures, and suitable filters for selective insertion or removal from the optical paths formed by the individual fiber bundles.

Further as illustrated in FIG. 3, end 58 of the surgical device may be provided with a suitable adapter 28' which may selectively receive a condensing lens or lens system 70 and a suitable optical system illustrated as lens 34' for focusing the high intensity coagulating light beam, the illuminating light beam, and the optical image on the surgical locus illustrated in FIG. 3 as an eye 72.

Where a condensing lens 70 is employed at end 58 of the device, to render emergent rays relatively parallel, the condensing lens is preferably annular in form with the opening 74 therein sized and optically arranged to permit the image, to be transmitted through the image transmitting fiber bundle 52, to pass therethrough without distortion.

From the foregoing discussion of the form of the invention shown in FIGS. 3 and 4, it will be appreciated by those skilled in the art that a very useful surgical device is provided which permits a surgeon to observe a surgical locus, focus an illuminating beam on the exact area to be treated and then while continuing to observe the locus, direct a high intensity coagulating beam of light to the area while he maintains orientation during the therapy.

It will be appreciated that various modifications may be made by those skilled in the art in this form of the invention without departing from the scope of the appended claims. For example, the observation of the surgical locus need not be direct as illustrated in FIG. 3 as the image transmitting fiber optical bundle 52 may be associated with an electrical image transmitting device and the surgical locus viewed through a conventional television screen monitoring device. Further, it will be appreciated that the device illustrated in FIGS. 3 and 4 may only comprise a pair of fiber optical bundles; that is, an image transmitting bundle and a light transmitting bundle. The light transmitting bundle may be selectively connected to a source of illuminating light and a source of high intensity coagulating light with suitable hand or foot actuated switch means for directing the high intensity light beam through the fiber bundle and interposing a filter between the observer 63 and the observation end 60 of the image transmitting fiber optical bundle 52.

It is to be further understood that the various specific embodiments disclosed herein are merely illustrative of the general principles of the present invention and the invention is not limited beyond the terms of the appended claim.

We claim:

Means for supplying to a surgical locus to effect photocoagulation a high intensity beam of light having wave lengths in the range of from about 3000 to about 6000 A., said means comprising a source of light including wave lengths in said range, a first flexible bundle of glass fibers transparent to light in said range, optical elements directing light from said source to one end of said bundle, a second flexible bundle of image transmitting glass fibers adapted to transmit an image of the surgical locus to a point remote therefrom, and a third flexible bundle of light transparent glass fibers, a source of low intensity light in the visible wave lengths, and optical elements directing light from said low intensity light source to one end of said third flexible bundle of light transparent glass fibers.

References Cited

UNITED STATES PATENTS

| | | | |
|---|---|---|---|
| 2,825,260 | 3/1958 | O'Brien | 128—6 |
| 2,843,112 | 7/1958 | Miller | 128—6 X |
| 2,929,922 | 3/1960 | Schawlow | 128—395 X |
| 2,930,379 | 3/1960 | Dopp | 128—396 |
| 3,068,739 | 12/1962 | Hicks | 128—6X |
| 3,084,694 | 4/1963 | Kavanagh | 128—396 |
| 3,096,767 | 7/1963 | Gresser | 128—395 |

OTHER REFERENCES

"Encyclopedic Dictionary of Electronics" by Sarbacher, 1959.

RICHARD A. GAUDET, *Primary Examiner.*

L. R. PRICE, R. J. HOFFMAN, SIMON BRODER,
*Examiners.*